United States Patent [19]

Stark et al.

[11] 4,071,495

[45] Jan. 31, 1978

[54] REINFORCED POLYVINYLIDENE FLUORIDE MOLDING COMPOSITIONS

[75] Inventors: Ernst-Joachim Stark, Troisdorf; Peter Vanhaiden, Bonn-Hersel; Herbert Klinkenberg, Troisdorf-Eschmar, all of Germany

[73] Assignee: Dynamit Nobel Aktiengesellschaft, Troisdorf, Germany

[21] Appl. No.: 771,720

[22] Filed: Feb. 24, 1977

[30] Foreign Application Priority Data

Mar. 4, 1976 Germany .............................. 2608898

[51] Int. Cl.$^2$ ................................................ C08K 7/14
[52] U.S. Cl. ............................... 260/42.18; 260/42.15
[58] Field of Search ........................................ 260/42.18

[56] References Cited

U.S. PATENT DOCUMENTS

| | | | |
|---|---|---|---|
| 3,898,361 | 8/1975 | Bjerk et al. | 260/42.18 |
| 3,935,159 | 1/1976 | Demillecamps | 260/42.18 |

OTHER PUBLICATIONS

Wake, William C., Fillers for Plastics, Iliffe Books, London, 1971, pp. 108–109.

*Primary Examiner*—James H. Derrington
*Attorney, Agent, or Firm*—Burgess, Dinklage & Sprung

[57] ABSTRACT

A reinforced polyvinylidene fluoride-containing molding composition containing a polyvinylidene fluoride polymer and reinforcing glass fibers, the fibers having between 10 and 28 weight percent of basic oxides and up to 6 weight percent boron oxide, the amount of boron oxide being no more than twice as great as the amount of alkali oxides contained in the basic oxides.

10 Claims, No Drawings

REINFORCED POLYVINYLIDENE FLUORIDE MOLDING COMPOSITIONS

BACKGROUND OF THE INVENTION

1. Field Of The Invention

This invention relates to an improved molding composition containing a polyvinylidene fluoride polymer reinforced by glass fibers which composition can be thermoplastically worked. This invention relates to a reinforced polyvinylidene fluoride molding composition which can be worked by thermoplastic forming techniques.

2. Discussion Of The Prior Art

It is known that polyvinylidene fluoride (PVDF) is increasingly used in chemical apparatus and chemical plant construction on account of its resistance to chemicals and its thermal stability. Also, the good mechanical characteristics of unreinforced PVDF qualify this material for such uses.

In spite of these very favorable characteristics, there are applications in which PVDF could be used, in which its mechanical strength, especially under high temperature exposure, needs to be further improved. An improvement of such characteristics, such as the modulus of elasticity or the thermal stability of shape, would also make possible the use of smaller quantities of this material in the same applications without loss of strength.

The ability of PVDF to withstand mechanical stresses at temperatures above 100° C is insufficient for many applications, so that it is desirable to improve these characteristics in this regard as well.

It is also known to improve the mechanical characteristics of thermoplastics by incorporating fibrous materials into them, especially glass fibers. The incorporation of these reinforcing additives and the further working of the compositions reinforced by them is accomplished without difficulty in the case of the known thermoplastics. For example, compositions containing polyvinyl chloride, polyesters, polyamides and copolymers of ethylene and tetrafluoroethylene (PTFE) are compatible with glass fibers and can be extruded or injection molded on known machinery together with glass fibers of any desired composition.

In contrast thereto, PVDF is incompatible with the glass fibers commonly used in plastic reinforcing under the thermal and mechanical conditions of thermoplastic incorporation and shaping. This manifests itself in the fact that, when regular commercial glass fibers are incorporated into into them in the extruders known for the purpose, more or less severe degradation of the PVDF takes place, depending on the composition of the glasses, with the formation of gaseous hydrogen fluoride, which can be harmful to the health; in the worst case, the degradation can result in the destruction of the extruding machine.

These disadvantages of the thermoplastic incorporation of glass fibers are encountered even when sized glass filaments are used, so that it has hitherto been impossible to determine the cause of such degradation.

Instead of incorporating glass fibers into compositions containing PVDF by extrusion, it has therefore been proposed to bind the PVDF compositions to glass fiber fabrics or mats at temperatures below the dangerous temperature range.

This can be accomplished by various bonding methods, such as flame bonding or compression. The PVDF can also be applied to the fabrics or mats in the form of a dispersion. The disadvantage of these methods is that they are very labor intensive, and the products obtained cannot be further worked thermoplastically into all kinds of shaped products.

The problem therefore existed of finding a fibrous material with which PVDF can be reinforced without encountering the above-mentioned disadvantages. The problem furthermore existed of finding reinforced PVDF compositions which can be further worked by thermoplastic shaping methods.

It is an object of this invention, therefore, to provide a polyvinylidene fluoride polymer composition which is reinforced with a fibrous composition which does not adversely effect the polyvinylidene fluoride when the same is thermoplastically formed into a desired shape. It is a further object of this invention, therefore, to provide a glass fiber reinforced polyvinylidene fluoride polymeric composition in which there is no adverse glass fiber-polyvinylidene fluoride polymer interaction. It is a further object of this invention, therefore, to provide a polyvinylidene fluoride glass fiber reinforced molding composition in which during formation of the mass into desired shape substantial quantities of gaseous hydrogen fluoride are not evolved. It is a further object of this invention to provide a polyvinylidene fluoride molding composition which can be worked at temperatures of up to 350° C thermoplastically without degradation of the polymer. These and other objects of this invention will become apparent from the following description and claims.

SUMMARY OF THE INVENTION

Broadly this invention contemplates a reinforced polyvinylidene fluoride-containing molding composition comprising a polyvinylidene fluoride polymer and reinforcing glass fibers, said glass fibers having between 10 and 28 weight percent of basic oxides and up to 6 weight percent boron oxide, the amount of boron oxide being no more than twice as great as the amount of alkali oxides contained in said basic oxides.

It has been found that the solutions to the above-mentioned problems lie in the selection of glass fibers of a particular composition as described above. It has been surprisingly been found that glass fibers which consist of a glass of the claimed composition are completely compatible with polyvinylidene fluoride polymers. These compositions can be transformed to products of any desired form, e.g., in injection molding machines or in extrusion machinery.

The term "basic oxides", as used herein, is to be understood to refer to the oxides of elements of the first and second principal group of the Periodic System. It is not essential that the cations of these oxides be in oxidic form, but they can be attached in other ways to the rest of the glass components. The stated content is a merely calculated figure that means the analytical data of the metals are given as the corresponding oxides.

The term "alkali oxides", as used herein, is to be understood to mean, again on a purely calculated basis, the oxides of the alkali metals, mainly of sodium and potassium.

The content of the other cations in the glasses is of virtually no importance as regards compatibility with PVDF. The glasses can easily contain even up to 36% of lead oxide without affecting compatibility with PVDF, if the content of basic oxides, alkali oxides and boron oxide is within the stated limits.

Since for the reasons stated above, it is too dangerous to test mixtures of PVDF and glass fibers of unknown behavior by working them experimentally in screw or plunger types of plasticizing apparatus, a method had to be found of determining the relative compatibility of the components with one another by an undangerous microtesting method. It was found that thermogravimetric analysis (TGA) is a suitable method for this purpose. In this test method a measurement is made on small specimens of the weight loss in relation to time and temperature. This weight loss is considered to be a measure of thermal stability.

It was found that safe thermoplastic workability can be predicted if the weight loss does not exceed a certain limit. One of the following conditions are necessary for compatibility:

1. At a constant heating rate of 8° C per minute, the material must undergo no loss of weight up to 300° C.
2. Upon further heating, a weight loss of 1% must not occur before the temperature exceeds 350° C.
3. Upon heating at a constant rate of 8° C per minute to 350° C, if the weight loss begins in the range between 300° and 350° C, the acceptable total weight loss after 15 minutes at 350° C must amount to no more than 5 percent; if the onset of decomposition only takes place in the isothermal phase at 350° C, the weight loss after 15 minutes at 350° C must not amount to more than 15 %.

The glasses of the invention fulfill at least one of these conditions, as it will be shown in the examples given further below.

The analysis data of the glasses are based on the optical spectral analysis (OSA) of powdered specimens burned in the electric arc.

The amount of glass filaments which can be incorporated into the PVDF compositions are between 20 and 40% by weight. Smaller amounts can, of course, be incorporated, but in that case the mechanical strengthening is not as great. The length of the filaments is the same as that used in the glass fiber reinforcement of other thermoplastics. In general, it is between 0.2 and 6mm.

The term "compositions containing PVDF", as used herein, is to be understood to mean both PVDF and copolymers of vinylidene fluoride and other vinyl compounds (with vinyl acetate, for example) or compositions. An example of such a composition is a mixture of PVDF and a polyacrylate such as polymethylmethacrylate, for example.

The incorporation of the glass fibers into the PVDF compositions is accomplished in a known manner. In general, the components are mixed together, the PVDF being in powder form, and then follows a melting of this mixture, either in an injection molding machine, in a roller mixer, or in a granulating procedure carried out in an extruding machine, for example. The glass fibers are optionally to be sized in a known manner with a known adhesivinzing agent. Suitable adhesivinzing agents in the present case are especially organofunctional silanes, such as, for example, aminoalkyltrialkoxysilanes. In in the following Table 1 there is given the composition of a variety of glasses, glasses 2 to 5 having a composition in accordance with the invention, while glasses 1 and 6 to 9 serve for purposes of comparison.

Mixtures of these glasses with PVDF (10 wt.-parts of glass fibers and 90 wt-parts of PVDF) were subjected to a thermogravimetric analysis. The results of these thermogravimetric studies are given in the following Table 2. The initial weight of the mixtures tested was between 30 and 100 mg. The heating was performed in all cases at a rate of 8° C per minute.

The glass filaments corresponding to numbers 2 to 5 in Table 1 were cut to fibers of a length of 3 to 6 mm. Of these filaments, 30 parts by weight were mixed with a powdered PVDF and the mixture thus obtained was extruded to form strands. The strands were chopped into granules.

Injection moldings in the form of 4 mm thick test plates were prepared from the granules. These test plates served as starting material for test specimens with which the physical measurements given in Table 3 were performed. In the test specimens thus obtained, the average length of the glass fibers was no greater than 0.4 mm.

The ultimate tensile strength given in Table 3 was measured in accordance with DIN 53,455. The modulus of elasticity was determined in accordance with DIN 53,457 and the ball impression hardness in accordance with DIN 53,456, method Hc.

Table 1

| % | Chemical Composition of the Glasses |  |  |  |  |  |  |  |  |
|---|---|---|---|---|---|---|---|---|---|
| No. | 1 | 2 | 3 | 4 | 5 | 6 | 7 | 8 | 9 |
| $SiO_2$ | 65 | 82 | 66 | 78 | 60 | 65 | 62 | 61 | 68 |
| $Al_2O_3$ | 13.5 | 4 | 21 | 15 | 4.8 | 12 | 12.5 | 13.5 | 12 |
| CaO | 14 | 8 | 5.6 | trace | 9.3 | 15.5 | 20 | 20.5 | 15.5 |
| MgO | 0.8 | 3 | 8 | 12 | 3.5 | 4.5 | 0.5 | 2.1 | 0.6 |
| $Na_2O$ | trace | 3 | trace | trace | 15.0 | 0.7 | 0.3 | — | 0.3 |
| $K_2O$ | — | — | — | — | — | — | 0.6 | — | — |
| $B_2O_3$ | 9 | 5.6 | 0 | 0 | 2.1 | 5.8 | 5.8 | 7 | 8.2 |

Table 2

Thermogravimetric tests

| Glass No. | Percentage of Weight Loss | | 1% Weight Loss occurs after heating to (° C) | Compatibility with PVDF |
|---|---|---|---|---|
| | After heating to 350° C | After heating and 15 minutes at 350° C | | |
| 1 | 9.9 (from 295° C) | 21 | 341 | incompatible |
| 2 | 2.7 (from 345° C) | 30 | 355 | compatible |
| 3 | 0.3 (from 330° C) | 5 | 375 | compatible |
| 4 | 0.3 (from 325° C) | 5 | 367 | compatible |
| 5 | 0 | 27 | 353 | compatible |
| 6 | 30 (from 323° C) | 46 | 317 | incompatible |
| 7 | 8 (from 326° C) | 23 | 333 | incompatible |
| 8 | 27 (from 320° C) | 40 | 327 | incompatible |
| 9 | 24 (from 323° C) | 39 | 327 | incompatible |

Table 3

| | Mechanical Characteristics of unreinforced PVDF (MFI 20) and of PVDF (MFI 20) reinforced with 30% of glass fibers | | | |
|---|---|---|---|---|
| | Ultimate tensile strength (N/mm$^2$) | Modulus of Elasticity (Tensile Test) (N/mm$^2$) | Ball Impression Hardness (N/mm$^2$) | Thermal Stability of Shape, ISOR 75 A (K) |
| Unreinforced | 40 | 1800 | 100 | 365 |
| Reinforced with Glass 2 | 54 | 4500 | 128 | 392 |
| Reinforced with Glass 3 | 56 | 4800 | 127 | 394 |
| Reinforced with Glass 4 | 62 | 4900 | 129 | 394 |
| Reinforced with Glass 5 | 50 | 3800 | 122 | 388 |

What is claimed is:

1. A reinforced polyvinylidene fluoride-containing composition comprising a polyvinylidene fluoride polymer and reinforcing glass fibers, said fibers having between 10 and 28 weight percent of basic oxides and up to 6 weight percent of boron oxide, the amount of boron oxide being no more than twice as great as the amount of alkali oxides contained in said basic oxides.

2. A reinforced polyvinylidene fluoride-containing composition in accordance with claim 1 wherein said fibers are present in an amount of up to 40 percent by weight of said composition.

3. A reinforced polyvinylidene fluoride-containing composition in accordance with claim 2 wherein said fibers are present in an amount of 20-40 percent by weight of said composition.

4. A reinforced polyvinylidene fluoride-containing composition in accordance with claim 1 wherein alkali oxides are sodium or potassium oxides.

5. A reinforced polyvinylidene fluoride-containing composition in accordance with claim 1 wherein said polyvinylidene polymer is a polyvinylidene homopolymer.

6. A reinforced polyvinylidene fluoride-containing composition in accordance with claim 1 wherein said polyvinylidene fluoride polymer is a copolymer of PVDF with another vinyl compound.

7. A reinforced polyvinylidene fluoride-containing composition in accordance with claim 1 wherein said composition loses less than 1% by weight when heated to 350° C.

8. A reinforced polyvinylidene fluoride-containing composition in accordance with claim 1 wherein said composition undergoes no loss of weight when heated to 300° C at a constant heating rate of 8° C per minute.

9. A reinforced polyvinylidene fluoride-containing composition in accordance with claim 1 which when heated at a constant heating rate of 8° C per minute loses weight in the range 300° up to 350° C but the total weight loss after 15 minutes at 350° C amounts to no more than 5%.

10. A reinforced polyvinylidene fluoride polymer according to claim 1 wherein when said composition is heated at a constant heating rate of 8° C per minute the onset of decomposition takes place only in the isothermal phase at 350° C and the weight loss after 15 minutes at 350° C does not exceed 15%.

* * * * *